United States Patent [19]

Flax

[11] 4,304,971
[45] Dec. 8, 1981

[54] PUSH-BUTTON TELEPHONE LOCKING DEVICE

[75] Inventor: Louis Flax, Moonachie, N.J.

[73] Assignee: Televault, Inc., East Windsor, N.J.

[21] Appl. No.: 58,424

[22] Filed: Jul. 18, 1979

[51] Int. Cl.³ .............................................. H04M 1/66
[52] U.S. Cl. ................................ 179/189 D; 179/90 D
[58] Field of Search ............. 179/189 D, 90 D, 90 K, 179/90 R, 18 DA, 14

[56] References Cited

U.S. PATENT DOCUMENTS

| | | | |
|---|---|---|---|
| 3,866,000 | 2/1975 | Gillis | 179/189 D |
| 3,899,647 | 8/1975 | Nachsi et al. | 179/189 D |
| 3,965,310 | 6/1976 | Willy | 179/189 D |
| 4,005,279 | 1/1977 | Richter | 179/189 D |
| 4,081,630 | 3/1978 | Washburn et al. | 179/189 D |
| 4,131,769 | 12/1978 | Davis | 179/189 D |

*Primary Examiner*—Gerald L. Brigance
*Attorney, Agent, or Firm*—Shoemaker and Mattare, Ltd.

[57] ABSTRACT

A telephone locking device for preventing unauthorized use of a push-button type telephone includes a shield covering at least one of the dial push-buttons to prevent unauthorized access to that push-button. The shield is held on the telephone by a push-button gripping device, and a key is required to release the shield.

3 Claims, 4 Drawing Figures

U.S. Patent  Dec. 8, 1981  4,304,971
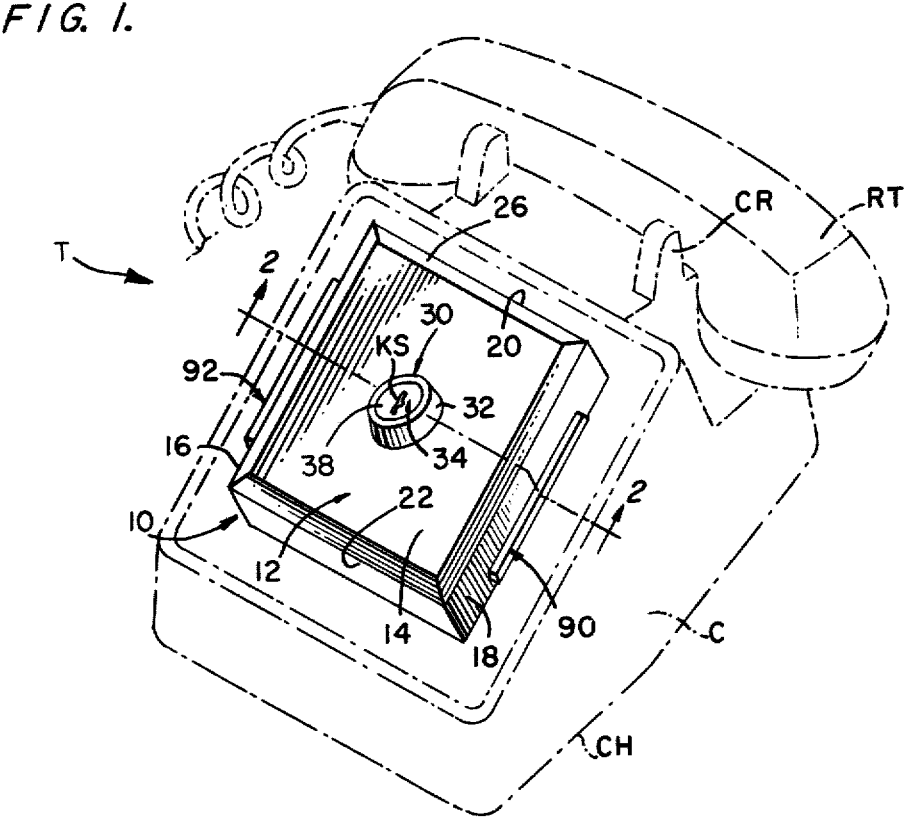
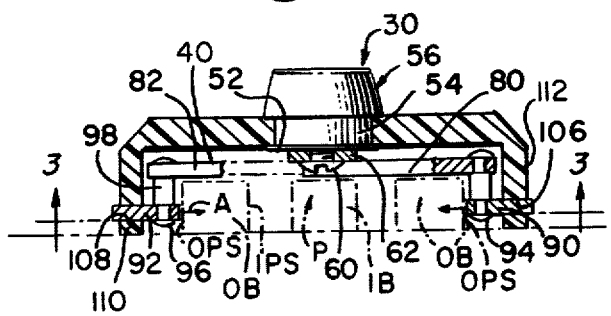
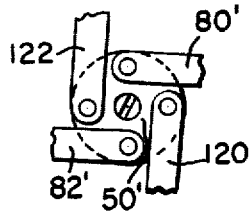
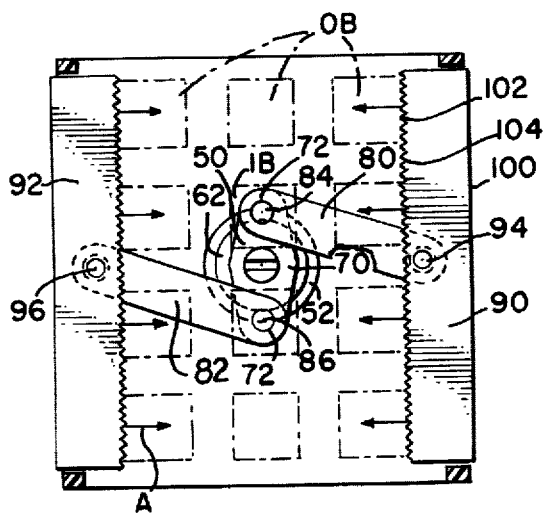

PUSH-BUTTON TELEPHONE LOCKING DEVICE

BACKGROUND OF THE INVENTION

The present application is related to the device disclosed in Application Ser. No. 47,307, filed June 14, 1979.

The present invention relates in general to telephones, and, more particularly, to devices for preventing unauthorized use of a telephone.

Unauthorized use of telephones has, in recent years, become an extremely large source of loss to businesses as well as to telephone companies. This unauthorized use includes the placing of unauthorized long distance telephone calls, illegal use of Watts lines or the like, or other such unauthorized use. Often, an unauthorized user tampers with the dialing mechanism of a telephone to execute the unauthorized use. Such tampering may damage the telephone, thereby adding further costs to the costs engendered by the unauthorized use itself.

Prevention of unauthorized use of a telephone is complicated somewhat by the insistence of telephone manufacturers that nothing permanent be attached to a telephone. Thus, screws, bolts or other such mounting means cannot be used to affix a dial-locking device on a telephone.

There are telephone locking devices presently available, and the most well known of these devices is the lock cylinder used in conjunction with dial telephones. However, there are no similar devices known for use with push-button telephones.

One device for preventing unauthorized use of a push-button telephone includes a lock placed on the receiver-depressed button located in the receiver cradle. This lock keeps this button depressed even when the telephone receiver-transmitter is not accommodated in the receiver cradle. This locking device is only marginally effective because it is very easily defeated. One wishing to use a telephone equipped with such a lock merely removes the entire case section from the telephone by backing two screws in the telephone chassis out and lifting the case off that chassis. The case, along with the locking device, is thus removed and the telephone remains usable. After completion of the unauthorized use, the telephone case is simply replaced, and there is no sign of such unauthorized use.

The known devices suffer still a further drawback because such devices require the entire telephone to be disabled. If a user wishes only a single button disabled, these known devices are virtually useless. Such a situation arises when a business has an internal telephone system coupled to the usual external telephone system by depressing a particular button, such as the nine button, then dialing the external telephone number. If such a business wishes to prevent external calls on certain telephones, only the nine button need be disabled, and not the entire telephone.

There is thus a need for a telephone locking device which discourages, if not totally prevents, unauthorized use of a push-button telephone. The locking device should prove tampering or unauthorized use, and should be able to disable only a single button if so desired by a user.

SUMMARY OF THE INVENTION

The device embodying the teachings of the present invention effectively disables one or a plurality of push-buttons of a push-button telephone in a manner which prevents, or at least discourages, unauthorized use of the telephone. Even if the device of the present invention is somehow defeated or circumvented, the unauthorized use of the telephone is made evident by the device.

The telephone locking device embodying the teachings of the present invention includes a shield having a recess defined in one side thereof. The recess accommodates at least one button of the array of push-buttons found on a push-button telephone. The shield is attached to the telephone to prevent access to the accommodated push-button. Thus, once the shield is in place, use of a push-button accommodated in a recess is prevented, or at least discouraged. The shield can also cover the entire array of push-buttons if so desired, or several of those buttons.

The device includes clamping means for clasping one or more of the push-buttons individually to thereby secure the shield onto the telephone. The clamping means includes a plurality of bars which are cam actuated with movement of the cam being controlled by a locking mechanism. The bars contact all of the outer buttons. These bars are located in the columns and rows defined between the central push-buttons having the digits two, five, eight and zero thereon and the outer push-buttons having the digits one, two, three, four, six, seven, nine and zero. These bars include a pair of longitudinally disposed bars and a pair of transversely disposed bars. The bars are connected by a mechanical means to a cam operated by a key barrel. All of the outer push-buttons are thus wedged against the shield chamber to lock the shield onto the dial buttons. Conversely, the bars can clamp the buttons from the outside, with the outer buttons corresponding to digits one, two, three, four, six, seven, nine and zero being unsupported. Thus, a key unlocks the lock, and permits movement of the cam which causes corresponding movement in the clamping mechanism bars to free the clamped push-button, and thereby permit removal of the shield from the telephone.

The device of the present invention cannot be circumvented by removal of the case from the telephone, as even without the case, access to the push-buttons themselves is prevented by the shield.

The device of the present invention cannot be removed without scarring, or severely damaging, the telephone, and in particular, the push-buttons. Circumvention of the device is thus easily proved. Furthermore, the device cannot be reset without the use of a key, and thus, even if removed in an unauthorized manner, the device cannot be reset on the telephone, again proving unauthorized use.

The device is easily placed on any push-button telephone, and does not require any modification of the telephone. The requirement of the telephone manufacturers that no permanent device be fixed to the telephone is thus satisfied by the device of the present invention.

The device of the present invention is extremely versatile because it can be used to disable a single button or a plurality of buttons on the telephone.

In short, the device of the present invention effectively prevents, or at least provides substantial discouragement of, unauthorized use of a push-button telephone without suffering the drawbacks discussed above in regard to the prior art devices.

OBJECTS OF THE INVENTION

It is, therefore, a main object of the present invention to prevent unauthorized use of a push-button telephone.

It is another object of the present invention to prove unauthorized use of a push-button telephone.

It is still another object of the present invention to prevent unauthorized use of a push-button telephone without requiring any permanent attachments to be affixed to a telephone case.

It is yet another object of the present invention to provide a versatile device which prevents unauthorized use of a push-button telephone.

It is a further object of the present invention to provide a device which prevents unauthorized use of a push-button telephone and is easily installed and removed by an authorized person.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a perspective of a dial push-button telephone having thereon a locking device embodying the teachings of the present invention.

FIG. 2 is a view taken along line 2—2 of FIG. 1.

FIG. 3 is a view taken along line 3—3 of FIG. 2 showing the device in a locked configuration.

FIG. 4 is an alternative embodiment of the device embodying the teachings of the present invention.

DETAILED DESCRIPTION OF THE INVENTION

Shown in FIG. 1 is a dial push-button telephone T having a casing C mounted on a chassis CH and having a receiver cradle CR for accommodating a receiver-transmitter RT. The telephone T can be a single line telephone, or a multiple line telephone. The telephone T shown in FIG. 1 has a locking device 10 thereon for preventing, or at least severely discouraging, unauthorized use of the telephone T.

The locking device 10 is rectangular in peripheral shape, and includes a shield 12 having a front surface 14, sides 16 and 18, and ends 20 and 22. As shown in FIG. 1, the shield can have a chamfered surface 26 on the front surface thereof.

A shield mounting means 30 is attached for access thereto from the front of the shield. The mounting means 30 includes a tubular escutcheon 32 surrounding a locking means 34 which has a key barrel 38 telescopingly received in the escutcheon. An operating key slot KS is defined in the top surface of the key barrel to be presented outwardly of the shield as shown in FIG. 1. In the FIG. 1 embodiment, the top surface of the barrel 38 and the top surface rim of the escutcheon are coplanar with each other, and the mounting means 30 is located in the upper half of the shield as shown in FIG. 1 for a purpose to be discussed hereinafter.

The shield mounting and locking means are best shown and described in the above-referenced application, Ser. No. 47,307, filed June 14, 1979, and attention is directed thereto.

As shown in FIG. 2, the shield 12 has a dial push-button receiving chamber 40 defined therein by sides 16 and 18, ends 20 and 22 and front 14. The chamber accommodates dial push-buttons P which include inner buttons IB corresponding to the digits five and eight on the dial. The dial also includes outer buttons OB corresponding to the digits one, two, three, four, six, seven, nine and zero. The outer buttons have outer sides OPS and inner sides IPS. As shown in FIGS. 1 and 2, all of the buttons are encased by the shield 12 so that access thereto is prevented when the shield 12 is in position.

The locking means disclosed in FIGS. 1-3 herein includes a cam 50 attached for rotation with key barrel 52 rotatably mounted in tubular portion 54 of escutcheon 56 of the locking means 30. The key barrel is attached to the escutcheon by retractable tumblers which are operated by a key inserted into key slot KS. The escutcheon is securely mounted on the shield so that when the tumblers are extended, rotation of the key barrel is prevented. Only an authorized person will have a key suitable for unlocking the locking device 30. A set screw 60 attaches the cam to a washer 62, which is integrally attached to the bottom of the key barrel so that the cam rotates with the key barrel. The washer can fit into a slot defined in the cam so the cam is securely held on the key barrel.

The key barrel is operated by inserting a key into the key slot and operating the tumblers, or the like, to release the key barrel from the escutcheon.

The cam 50 is diamond-shaped and has a central section 70 and end sections 72. Pitman arms 80 and 82 are each attached at one end thereof to one end of the cam by pivot pins 84 and 86, respectively.

Gripping jaws 90 and 92 are attached to the pitman arms at the other ends thereof by pivot pins 94 and 96, respectively. Spacer sleeves 98 are located on the pivot pins 94 and 96 to keep the pitman arms properly located with respect to the gripping jaws.

The gripping jaws are elongate with horizontal side edges 100 and 102, with knurling or serrations 104 on the inner side edges 102. The outer side edges are blunt and extend through slots 106 and 108 defined in casing sides 110 and 112, respectively. The gripping jaws are thus slidingly supported on the telephone case, and connected to the pitman arms 80 and 82.

The pitman arms translate the rotary movement of the cam into translatory movement of the gripping jaws. Thus, counterclockwise movement of the cam 50 in FIG. 3 is translated into inward movement of the gripping jaws as indicated by arrows A in FIGS. 2 and 3.

The cam and pitman arms are sized so that rotation of the key barrel far enough to lock that barrel to the escutcheon causes tight engagement of the gripping jaws against sides OPS of the outer push-buttons OP. The shield is thus securely held on the dial by the engagement between the gripping jaws and the push-buttons.

The shield is released by inserting a key into the key slot KS to release the tumblers of the lock, then turning the key barrel to rotate the cam 50 in the clockwise direction as viewed in FIG. 3. The gripping jaws are moved away from the outer buttons, and these buttons are released. The shield is then released from the dial. The release shield is removed from the FIG. 1 dial covering position, and the telephone is free for use.

A modification of the locking device is shown in FIG. 4 wherein a circular cam 50' is mounted on the key barrel for rotation therewith. Pitman arms 80', 82', 120 and 122 are connected to the cam 50'. Each of the pitman arms is connected to a gripping jaw as in the FIG. 3 embodiment, with the arms 120 and 122 being connected to gripping jaws by pivot pins similar to the pivot pins 94 and 96. The gripping jaws associated with the arms 120 and 122 are spaced from the pitman arms by sleeves similar to the sleeves 98, and are slightly shorter than the gripping jaws 90 and 92 to fit between the last-mentioned jaws to define a complete circumference of a figure surrounding all of the buttons P. The gripping jaws associated with arms 120 and 122 will also be located in slots defined in shield ends 20 and 22 similar to the slotted mounting of jaws 90 and 92.

Operation of the modified locking device is similar to that of the FIG. 3 device, except that all of the outer buttons are gripped instead of just those shown in FIG. 3.

It is also noted that by positioning the gripping jaws between the rows and columns of the dial push-buttons, and sizing the gripping jaws accordingly, less than all of the dial push-buttons can be disabled. For example, a single dial push-button, such as the nine digit, can be disabled in this manner.

It is also noted that the present device, as well as the device disclosed in the parent application, can be used to disable the line selector buttons of a multi-line telephone, the push-buttons of a computer terminal, bank push-buttons, or the like, without departing from the scope of the present disclosures.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. An improvement in a locking device for preventing unauthorized use of a push-button telephone comprising a protective shield for preventing access to dial push-buttons on a dial push-button telephone, the shield including a front surface, a rear surface, sides and ends and having a push-button receiving chamber defined in said rear surface for accommodating therein the push-buttons, the chamber being located in the shield rear surface so that access to the interior of the chamber is only possible when the shield is removed from the telephone so that the shield prevents access to the dial push-buttons when the shield is in position on the telephone, the improvement comprising:

shield mounting means for detachably mounting the shield on the telephone, said shield mounting means including elongate slots defined in the shield sides, a pair of gripping jaws each being movably mounted in one of said elongate slots for movement into and out of said push-button receiving chamber, each jaw including a serrated inner edge located within the push-button receiving chamber, said mounting means further including a lock movably mounted on the shield and arms connecting each of said jaws to said lock in a manner which transmits lock movement to said jaws so that movement of said lock causes said jaws to move inwardly or outwardly of the chamber, said serrated edges contacting dial push-buttons and grasping such push-buttons to securely affix the shield to such grasped push-buttons upon inward movement of said gripping jaws, said gripping jaws each contacting a separate row of push-buttons and forcing all the buttons in such separate row inwardly during inward movement of such jaws.

2. The locking device defined in claim 1 including four connecting arms.

3. The locking device defined in claim 1 wherein said gripping jaws include knurled surfaces thereon for contacting push-buttons.

* * * * *